UNITED STATES PATENT OFFICE.

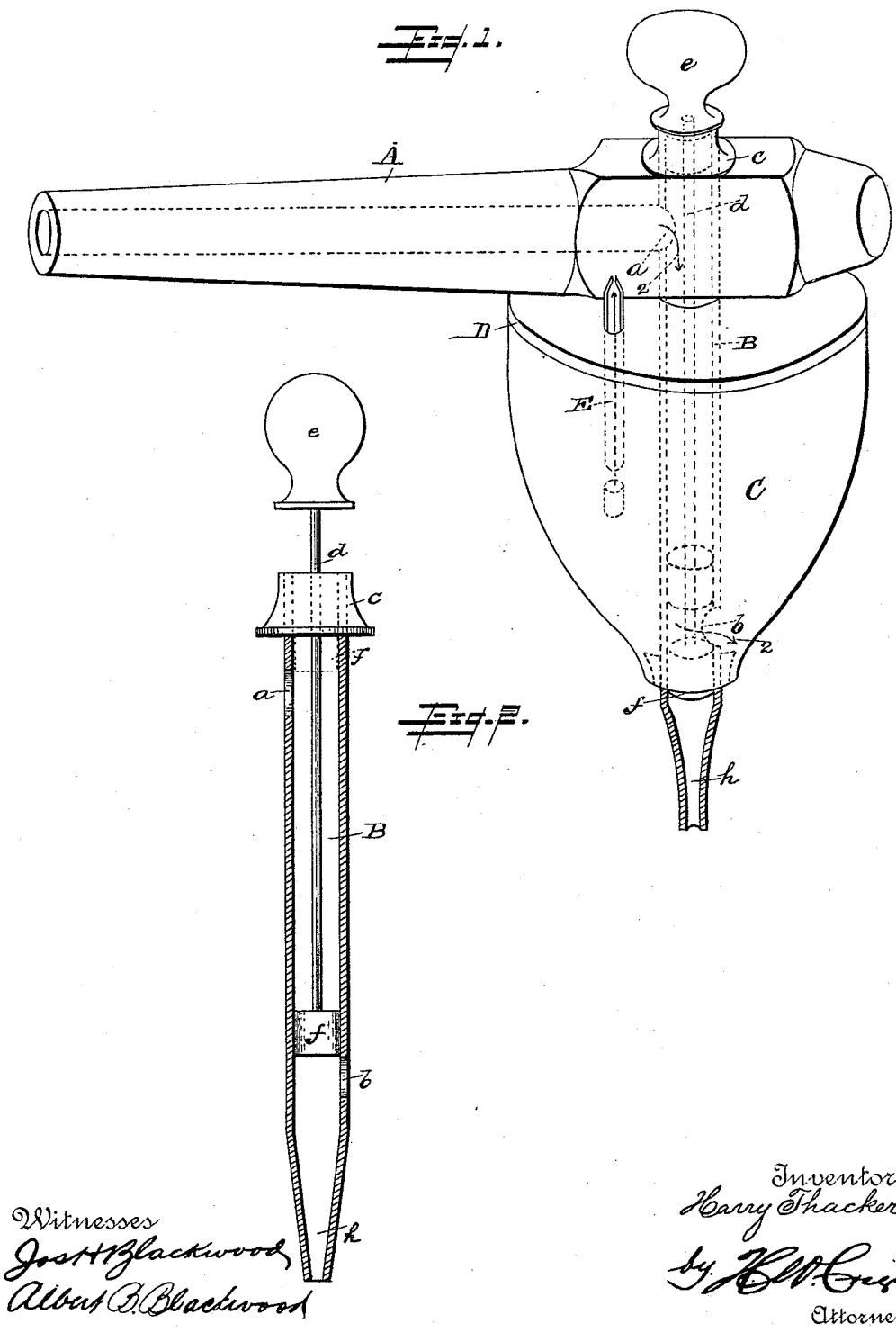

HARRY THACKER, OF LAKE VILLA, ILLINOIS.

MEASURING-FAUCET.

SPECIFICATION forming part of Letters Patent No. 449,143, dated March 31, 1891.

Application filed November 21, 1890. Serial No. 372,141. (No model.)

*To all whom it may concern:*

Be it known that I, HARRY THACKER, a citizen of the United States, residing at Lake Villa, in the county of Lake and State of Illinois, have invented certain new and useful Improvements in Measuring-Faucets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in measuring-faucets, and has for its object to provide a faucet of simple construction, whereby the liquid may be measured as drawn from the cask or receptacle and wherein the faucet will be durable and effective in operation and capable of being manufactured at a comparatively small cost.

The invention consists in the construction and operation of the several parts, as will be hereinafter fully set forth, and pointed out in the claim.

Reference is had to the accompanying drawings, forming a part of this specification, in which similar letters of reference indicate corresponding parts in the two figures.

Figure 1 is a perspective view of the device, and Fig. 2 a detail thereof.

In the drawings, A represents the faucet proper, which for convenience I call the "supply-faucet," and which is adapted to be attached to a cask, barrel, or other receptacle.

The supply-faucet, constructed of any approved material, is provided with an outlet tube or cylinder B, rigidly held in the outer end thereof. The tube B is provided with an inlet-opening $a$ and an outlet-opening $b$ and on its upper end with a cap $c$, centrally apertured to receive a rod $d$, carrying a knob $e$ and a plunger $f$. The lower part of the tube B extends into and is screwed or otherwise secured to a reservoir or filling-measure C, which may be made of glass or any other suitable material and be made to contain a pint, quart, gallon, or any desired quantity. D is the cover for the same.

The measure C is provided with a floating indicator E, so that if it is desired to measure any quantity less than the whole capacity of the measure the quantity will be registered on the indicator; or if the measure is made of opaque substance the float will tell when it is full. However, the indicator may be stationary, if desired, such as a marked glass let into the front of the measure.

The operation is as follows: The plunger, which is shown in dotted lines in a raised position in Fig. 1, is pressed downward until it passes the outlet-opening $b$, which, as will be seen by the arrows 2, allows the liquid to flow from the faucet A through inlet $a$ into tube B, through outlet $b$, and thence into the measure C. After the measure is filled or the desired quantity of liquid has been admitted thereto the plunger is raised and the liquid flows out through the outlet-opening $b$, through the funnel-shaped end $h$ of the tube B, and into any receptacle placed beneath it.

Having thus described my invention, what I claim, and desire to secure by Letters Patent, is—

The combination of a supply-faucet provided with an outlet tube or cylinder held rigidly in the outer end thereof, having inlet and outlet apertures, a solid vertically-moving plunger therein, and a centrally-apertured cap on the top of the said outlet tube or cylinder, through which the said plunger moves, with a measure inclosing the said outlet tube or cylinder, provided with a tap having a floating indicator passing through and held therein, substantially as described.

In testimony whereof I affix my signature in presence of two witnesses.

HARRY THACKER.

Witnesses:
G. L. STEWART,
L. B. STEWART.